Nov. 22, 1938.　　　　C. G. SEYFERTH　　　　2,137,703
LANDING GEAR
Filed June 26, 1937　　　　2 Sheets-Sheet 1

Inventor
Carl G. Seyferth
By:
Rasmussen & Brugna
Attorneys.

Nov. 22, 1938.  C. G. SEYFERTH  2,137,703
LANDING GEAR
Filed June 26, 1937   2 Sheets-Sheet 2
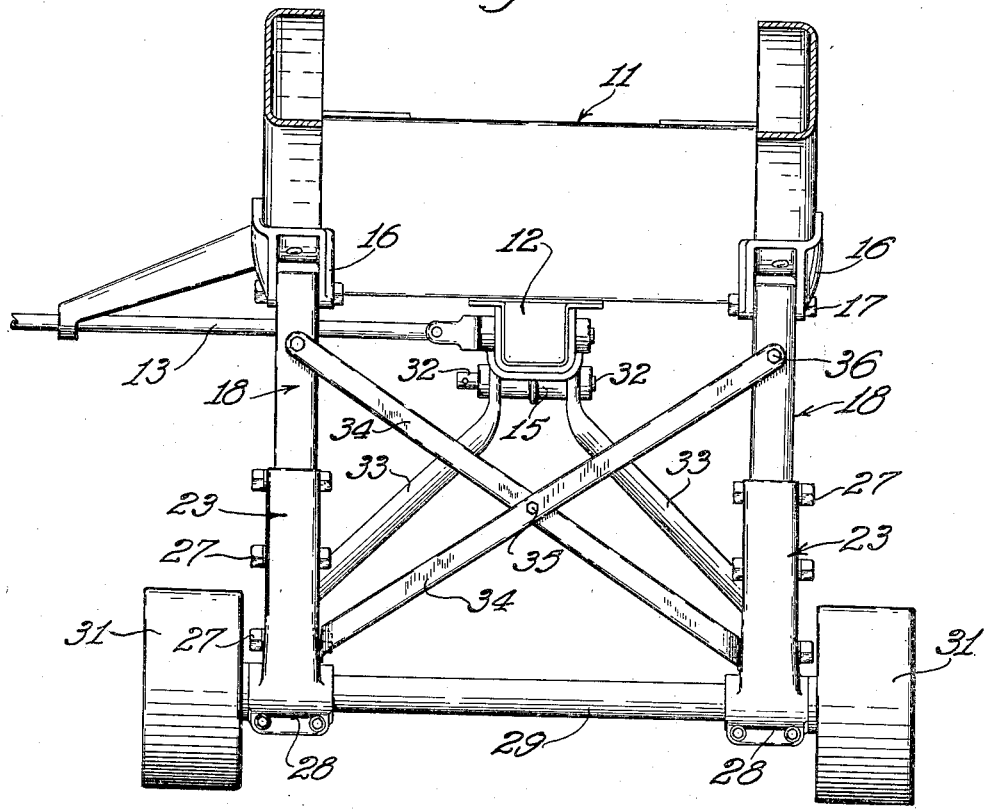
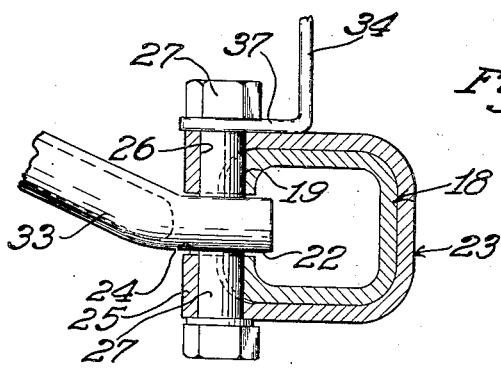
Inventor
Carl G. Seyferth
By: Rasmussen & Brugman
Attorneys.

Patented Nov. 22, 1938

2,137,703

UNITED STATES PATENT OFFICE 2,137,703

LANDING GEAR

Carl G. Seyferth, Muskegon, Mich.

Application June 26, 1937, Serial No. 150,556

5 Claims. (Cl. 280—33.1)

This invention relates to landing gears and has more particular reference to retractible landing gears for trailers.

A principal object of the invention is the provision in a swinging type of landing gear of adjustable legs therefor having novel means for maintaining said legs in desired adjusted position.

Another important object of the invention is the provision of telescoping leg members in a swinging type of landing gear, which are so formed as to facilitate longitudinal adjustment thereof and insure against accidental displacement from adjusted position.

Another important object of the invention is the provision of such adjustable leg members which may be cast from steel or the like to substantially eliminate any machining operations and thereby materially lower the cost of manufacture.

Numerous other objects and advantages of the invention will be apparent as it is better understood from the following description, which, taken in connection with the accompanying drawings, discloses a preferred embodiment thereof.

In the drawings,

Fig. 2 is a front elevational view of the mechanism of Fig. 1;

Fig. 5 is an enlarged detail horizontal sectional view through one of the leg members of the landing gear.

Figure 1:
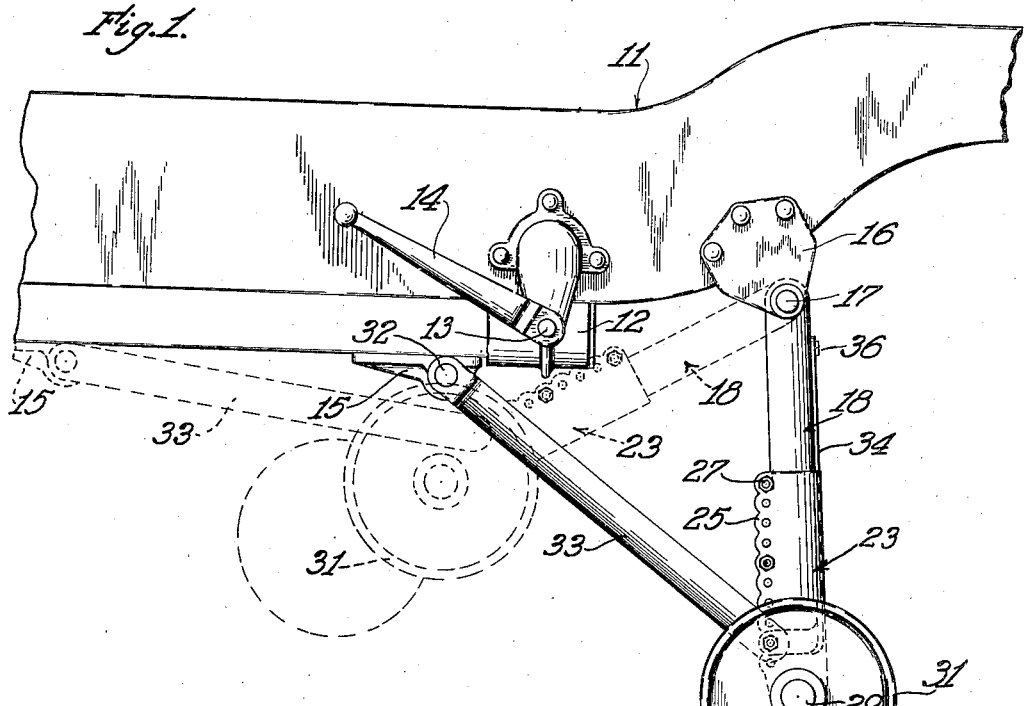
Figure 1 is a side elevational view of a part of a trailer showing a landing gear associated therewith embodying the features of my invention.

Referring more particularly to Figs. 1 and 2, reference numeral 11 indicates in general the frame of a trailer of any desired type upon which is mounted, in any suitable manner, a longitudinally disposed shaft member (not shown). This shaft terminates in a bearing housing or gear box 12, and is adapted to be rotated manually by means of a shaft 13 and a crank 14 secured thereto, or it may be rotated automatically in the coupling and uncoupling operations of the trailer with a tractor vehicle (not shown) in any suitable or desired manner.

As the shaft is rotated, a nut or head member 15 mounted thereon in any suitable manner is caused to move longitudinally between its full line and broken line positions of Fig. 1.

Figure 3:
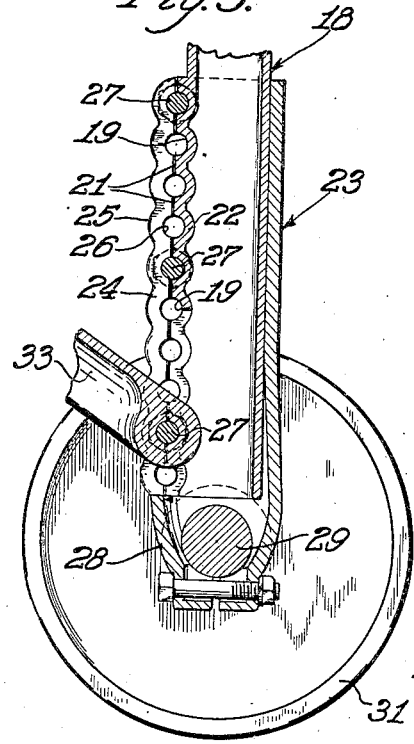
Fig. 3 is a longitudinal vertical section through a part of the mechanism of Fig. 1.
Figure 4:
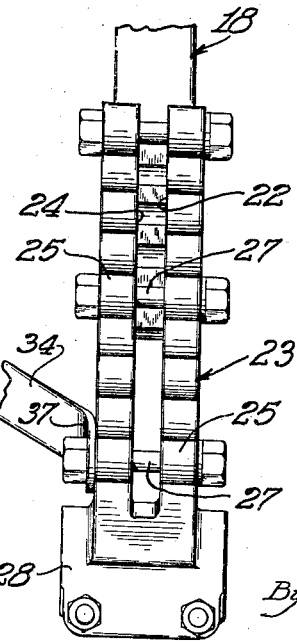
Fig. 4 is a detail rear elevational view of part of the mechanism of Fig. 1.

Rigidly mounted upon each side of the trailer frame 11, in any desired manner, is a suitable bracket member 16. Rotatably mounted at 17 in each of the brackets 16 is the upper end of an upper leg member 18. Each of the upper leg members 18 is hollow throughout its length, except at its upper end where suitable provision is made for its pivotal connection with the bracket 16, and in planes perpendicular to its axis it has the shape of a hollow square with rounded corners. Adjacent its lower end, note particularly Figs. 3 and 5, each of the upper leg members 18 is provided across its rearward face with a plurality of equally spaced parallel grooves or recesses 19 which are separated by ribs 21, the outer surfaces of which are in the plane of the major portion of the rear face of the leg. This rear side of the upper leg member 18 is also provided with a centrally disposed, longitudinal, closed-end slot 22.

A lower leg member 23 is provided for each of the upper leg members 18 which is also hollow throughout its length, except at its lower end, and of a similar cross sectional shape to the upper leg 18 so as to fit slidingly or telescopically thereon. For the major portion of its length the rearward side of each of the lower leg members 23 is provided with a substantially centrally disposed slot 24 which is open at its upper end. On each side of this slot the rearward side of the lower leg member 23 is provided with a plurality of longitudinally spaced parallel lugs 25 having bolt holes or apertures 26 extending therethrough. Through these holes 26 suitable bolts 27 are adapted to extend, and the spacing between the parallel lugs 25 is such that each of the bolts 27 will also co-operate or register with a groove 19. A plurality of lugs 25 and bolts 27 are provided to impart the desired strength and rigidity to the structure, the spacing between adjacent bolts 27 being an even multiple of the spacings between adjacent grooves 19.

The lower ends of the lower leg members 23 are provided with suitable split bearing or clamping portions 28 which are adapted to engage an axle 29 at each end of which is rotatably mounted in any desired manner a wheel 31.

Rotatably connected at their upper ends, as at 32, to the longitudinally movable head 15 are a pair of connecting members 33, the lower ends of which are pivotally connected to the lowermost bolt 27. These connecting members 33 preferably have an inverted U-cross-sectional shape, and are angularly offset at each end and provided with a solid bearing portion for engaging the respective pivot members 27 and 32.

It will be readily apparent, therefore, that longitudinal movement of the head 15 will cause swinging movement of the landing gear 18, 23, 31 between the full and broken line positions of Fig. 1.

As a means of strengthening the landing gear, a pair of cross brace members 34 are or may be provided, which are interconnected intermediate their ends, as at 35. The upper ends of these cross braces 34 may be connected by bolts 36, or the like, to the upper leg members 18 and the lower ends may be bent rearwardly, as at 37, and secured to the lower portion of the leg members by means of the lowermost bolts 27.

An important feature of the instant invention is that the upper and lower leg members 18 and 23 and the supporting members 33 and 34 may be cast, preferably of steel, in the shape or form as above described, and thereby eliminate or make unnecessary any machining operations in the manufacture of these parts.

In order to adjust the effective height of the above described landing gear, the bolts 27 are merely removed, the lower legs 23 repositioned relative to the upper legs 18, and the bolts reinserted and tightened up. The provision of slots 24 enables the legs 23 to be tightened around the legs 18 to spread the strain and load circumferentially thereof, and to aid in maintaining the bolts in tightened condition. The slots 24 and 22 also provide clearance for the lower ends of the connecting members 33, and the latter in conjunction with the closed-end slot 22 establish limits to the relative movement between the leg members 18 and 23. Different possible adjusted positions of the leg members 23 and wheels 31 relative to leg member 18 are shown in the full and broken line representations of these parts in Fig. 1. Even though the bolts 27 should work loose, the weight of the parts in retracted position end of the trailer when the latter is being supported thereby will effectively prevent accidental displacement thereof.

It will be apparent from the foregoing description that the ease of adjustment of the instant landing gear permits its use with practically any type of trailer. Due to the peculiar arrangement of the several parts, there is no necessity for the use of different length connecting members or back braces 33 or cross braces 34 when the leg members 23 are adjusted relative to the leg members 18, either with a given installation, or when the landing gear unit is used on a different type of trailer. Also, the instant landing gear may be used on trailers having widely different width frames. While the attachment of the landing gear to a wider or narrower frame necessitates back and cross braces having different effective lengths, if their point of connection to the leg members is maintained in a relatively similar position, this is readily taken care of in the instant device by merely changing the position of the bolts 27 which are used to secure the lower ends of the braces 33 and 34. This manner of securing these braces greatly simplifies the landing gear structure and eliminates additional fastening means.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a landing gear for trailers and the like, an upper leg member having a plurality of parallel grooves, a lower leg member slidably mounted on said upper leg member, a plurality of spaced lugs on said lower leg member, each of said lugs having an aperture therethrough adapted to register with a selected one of said grooves upon adjusting movement of said lower leg member relative to said upper leg member, a brace member connected at its upper end to said trailer and having its lower end disposed between said lugs on said lower leg member, and means adapted to cooperate with said alined grooves and apertures to lock said upper and lower leg members together in adjusted position and to secure the lower end of said brace member thereto.

2. In a device of the class described, an upper leg member, a lower leg member surrounding said upper leg member and adapted to be adjusted longitudinally relative thereto, and locking means for maintaining said lower leg member in a desired adjusted position, said means comprising a bolt co-operating with both said leg members, said lower leg member having a longitudinal slot in one side thereof perpendicular to said bolt, and said elements being so constructed and arranged that drawing up said bolt will cause said lower leg member to be contracted to firmly embrace said upper leg member and to aid in preventing accidental displacement of said bolt.

3. In a landing gear for trailers and the like, an upper leg member mounted on the trailer and having a plurality of spaced abutments on the outer surface thereof, a lower leg member associated with said upper leg member and having a plurality of spaced apertures therein, said apertures and abutments being so spaced that locking bolts inserted in said apertures will co-operate with said abutments to maintain said lower leg member in desired adjusted position on said upper leg member, and a brace member connected at one end to said trailer and at the other end to a said locking bolt.

4. In a landing gear for trailers and the like, a pair of upper leg members, a pair of lower leg members, means for adjustably securing said lower leg members to said upper leg members, respectively, and a pair of crossed braces, each of said braces being secured at one of their ends to one of said upper leg members and being adjustably secured at the other end to a said lower leg member by said means for securing the latter to its associated leg member.

5. In a landing gear for trailers and the like, a pair of upper leg members, a pair of lower leg members, means for adjustably securing said lower leg members to said upper leg members, respectively, comprising a plurality of bolts and a plurality of apertures in each of said leg members selectively positionable by relative movement of said leg members to receive said bolts, and a pair of cross braces, each of said braces being secured at its upper end to one of said upper leg members and being adjustably secured at its lower end to the other pair of leg members by a selected one of said bolts.

CARL G. SEYFERTH.